(12) United States Patent
Ishii et al.

(10) Patent No.: US 7,687,972 B2
(45) Date of Patent: Mar. 30, 2010

(54) DRIVE WAVE GENERATION CIRCUIT (75) Inventors: Takaaki Ishii, Osaka (JP); Yasuyuki Ueshima, Gunma-Ken (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 312 days.

(21) Appl. No.: 11/881,157

(22) Filed: Jul. 25, 2007

(65) Prior Publication Data
US 2008/0048523 A1 Feb. 28, 2008

(30) Foreign Application Priority Data
Jul. 26, 2006 (JP) ............................. 2006-203236
Jul. 26, 2006 (JP) ............................. 2006-203237

(51) Int. Cl.
*H02N 2/06* (2006.01)
(52) U.S. Cl. .................................................... 310/317
(58) Field of Classification Search ................. 310/314, 310/315, 316.01, 316.02, 316.03, 317
See application file for complete search history.

(56) References Cited
U.S. PATENT DOCUMENTS
5,936,644 A 8/1999 Ono et al.
7,301,556 B2 11/2007 Shin 2006/0061232 A1* 3/2006 Min et al. .................... 310/317
2006/0082253 A1* 4/2006 Hara ........................... 310/317
2006/0255685 A1* 11/2006 Yoshitomi et al. ........... 310/317

FOREIGN PATENT DOCUMENTS
KR 2002-11264 A 2/2002
KR 0388512 B1 9/2003

OTHER PUBLICATIONS
Korean Office Action for Korean Application No. 10-2007-74673, mailed on Dec. 19, 2008 (6 pages).
Okamoto, Y. et al., "The Development of a Smooth Impact Drive Mechanism (SIDM) Using a Piezoelectric Element", Konica Minolta Technology Report vol. 1 (2004), pp. 23-26 (4 pages).

* cited by examiner

*Primary Examiner*—Walter Benson
*Assistant Examiner*—Derek J Rosenau
(74) *Attorney, Agent, or Firm*—Osha • Liang LLP (57) ABSTRACT

Fundamental waveform data transferred through a serial interface is stored in a register. A fundamental waveform generation circuit uses the data to generate a fundamental waveform. A selector is capable of providing fundamental waveform data stored in a fixed memory to the register to replace the fundamental waveform data provided through the serial interface. An initial counter provides a low level signal to an exclusive OR gate until its count value reaches a first predetermined value. A direction control signal M/I is provided to the exclusive OR gate from an external source and the direction control signal M/I at high or low level inverts a direction control signal to be provided to a direction selector.

3 Claims, 5 Drawing Sheets

DRIVE WAVE GENERATION CIRCUIT

CROSS-REFERENCE TO RELATED APPLICATIONS

This application claims priority to Japanese Patent Application Nos. 2006-203236, filed on Jul. 26, 2006, and 2006-203237, filed on Jul. 26, 2006 which are incorporated herein by reference in its entirety.

BACKGROUND OF THE INVENTION

1. Field of the Invention

The present invention relates to a drive wave generation circuit which generates a drive wave for driving a piezo actuator.

2. Description of the Related Arts

Piezo actuators using elongation and contraction of a piezo element have been proposed and are attracting attention as promising ultra-small actuators (KONICA MINOLTA TECHNOLOGY REPORT VOL. 1 (2004), p. 23-26). Such piezo actuators are employed in a mechanism for driving an image capturing element in small cameras, such as those provided in cellphones, to compensate for camera shake or in a focusing mechanism that moves a lens.

In a piezo actuator, a voltage is applied to a piezo element (piezoelectric element) to elongate and contract the element, thereby generating a reciprocating movement of a drive shaft. By moving the drive shaft in one direction at one speed and in the opposite direction at a different speed (i.e., by causing slow elongation and quick contraction, or vice versa), a movable object in frictional contact with the drive shaft can be moved. Because elongation and contraction of a piezo element is used as a driving force in this way, linear movement of an object can be achieved without coils or the like, making it possible to downsize actuators.

In order to change the speed of reciprocating movement of the drive shaft, the waveform of a voltage applied to the piezo element must be changed. For example, in order to cause slow elongation and quick contraction, a voltage in a first direction must be applied slowly and a voltage in the other opposite direction applied abruptly.

To make duty ratio and timing variable for the voltage application pattern described above, setting data may be written in registers. For example, data transferred through a serial bus such as an I2C bus may be set in a register. "0" is set in the register during initialization after power on. When the data is "0", a drive wave is not generated. Accordingly, no drive wave is output until predetermined data is set in the register through the serial bus and thus operation for the initialization takes a long time.

In the case of focusing of a camera, typically the direction of infinity is set as the initial position. Therefore, a predetermined number of driving waves for driving the lens in a predetermine direction may be output during initialization. However, in operation, one may sometimes want to move the lens in the direction of macro as an initial setting.

SUMMARY OF THE INVENTION

The present invention enables selection as to which of fundamental waveform data transferred through a serial bus and fundamental waveform data from memory means is to be provided to a register and used. Using the fundamental waveform data from the memory means during initialization makes it possible to output a drive wave quickly.

Furthermore, the direction of a drive wave generated in accordance with an initial counter can be reversed in response to an external direction control signal. Therefore, the initial position can be set to any of the infinity direction and macro direction.

DESCRIPTION OF THE PREFERRED EMBODIMENTS

Embodiments of the present invention will be described with reference to the accompanying drawings.

Figure 1:
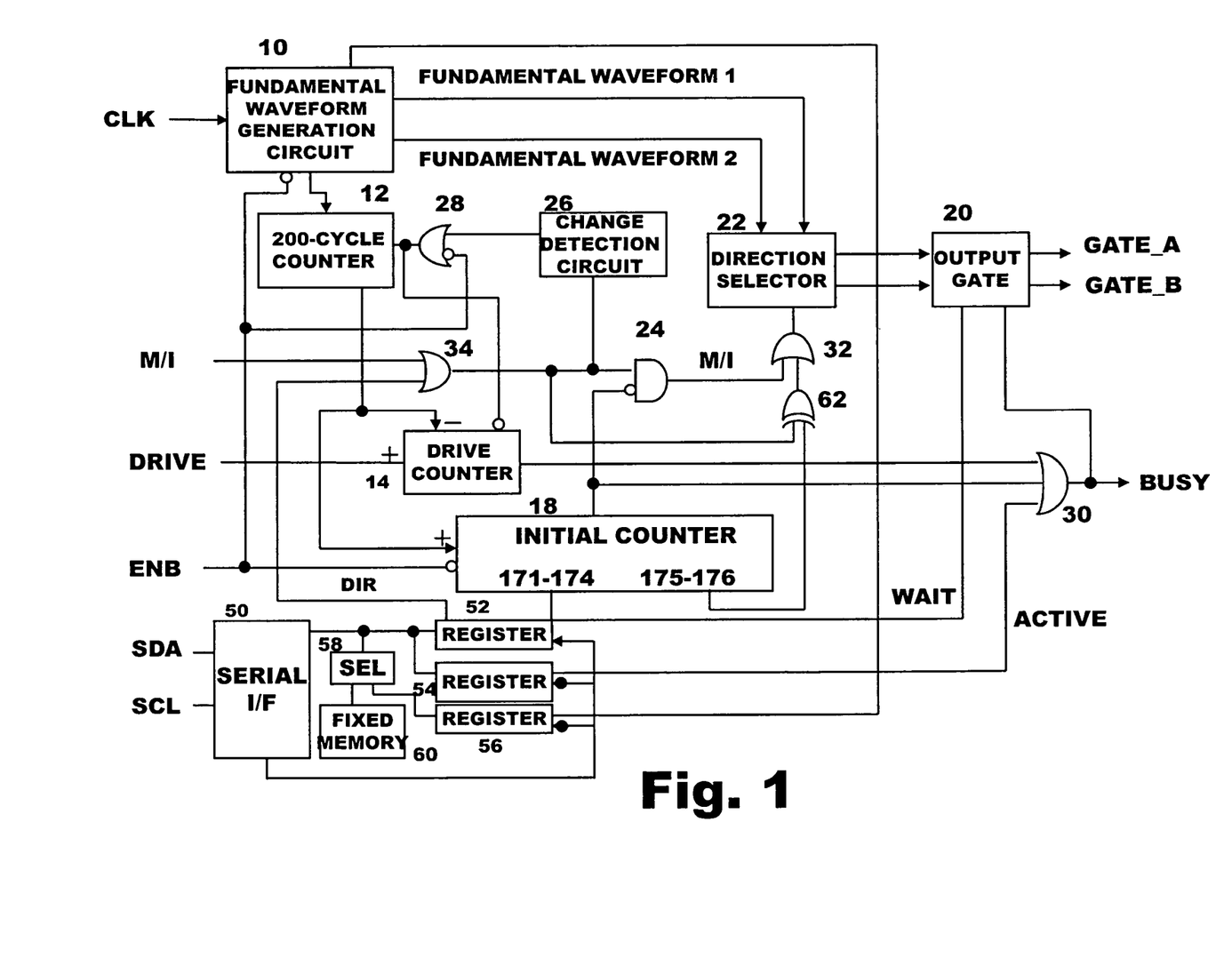
FIG. 1 is a diagram showing an overview of a drive wave generation circuit.

FIG. 1 shows an overview of a drive wave generation circuit according to an embodiment. The drive wave generation circuit is implemented as a single semiconductor integrated circuit (IC). Reference clock CLK, direction control signal M/I, drive pulse DRIVE, and enable signal ENB input terminals, as well as I2C bus SDA and SCL terminals for serial transfer, are provided. Three output terminals, GATE_A, GATE_B, and BUSY are provided.

A fundamental waveform generation circuit 10 outputs two fundamental waveforms (fundamental waveforms 1 and 2) in accordance with the reference clock CLK input from an external source. The fundamental waveform generation circuit 10 preferably has a counter that counts reference clock cycles in one cycle of the fundamental waveform, for example, and performs a logical operation of outputs from multiple flip-flops constituting the counter to generate high-level and low-level signals, thereby generating two types of fundamental waveforms 1 and 2. The fundamental waveform generation circuit 10 may have a memory containing the two fundamental waveforms 1 and 2 and may read the fundamental waveforms 1 and 2 and output them.

Figure 2:
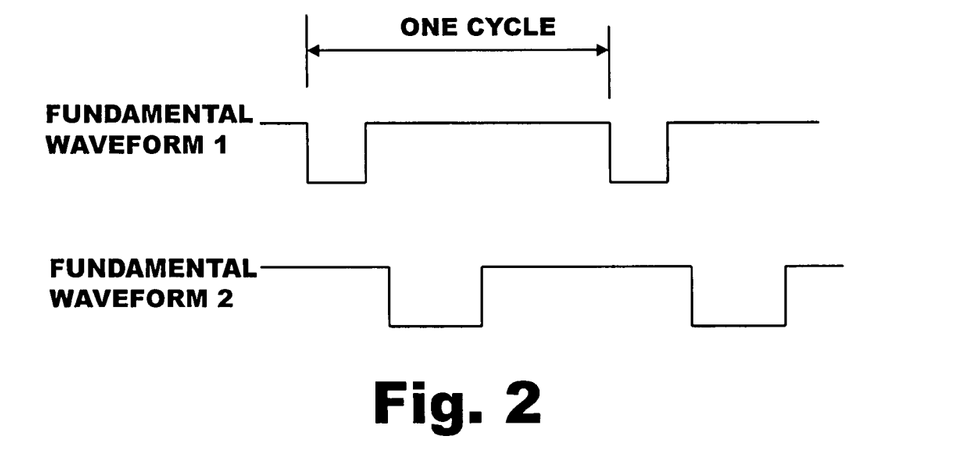
FIG. 2 is a diagram showing fundamental waveforms.

FIG. 2 shows an example of fundamental waveforms 1 and 2. For example, if the frequency of the reference clock CLK is 9.75 MHz, one cycle of the fundamental waveforms 1 and 2 is equal to 134 clock cycles(=13.74 μsec). The fundamental waveform 1 remains low for 22 clock cycles and then goes high, whereas the fundamental waveform 2 goes high and remains high for 26 clock cycles, goes low and remains low for 46 clock cycles, and then goes high. Accordingly, there is a period of 4 clock cycles between the end of a low-level period of the fundamental wave 1 and the beginning of a low-level period of the fundamental waveform 2.

The fundamental waveform generation circuit 10 outputs a 1-cycle pulse every cycle of a fundamental waveform. For example, the 1-cycle pulse may be 134 counts output from a counter that counts the reference clock cycles. The 1-cycle pulse is provided to a 200-cycle counter 12, which outputs a 200-cycle pulse (unit detection pulse) after counting 200 1-cycle pulses (one unit).

The 200-cycle pulse is input into a subtraction input terminal of a drive counter 14. The drive counter 14 has an addition input terminal through which a drive signal DRIVE is input from an external source (external microcomputer).

The drive counter 14 outputs a high-level signal at all times other than when outputting the initial value "0". To achieve this, all outputs from the flip-flops constituting the counter 14 may be ORed, for example, and the result may be output. The drive pulse DRIVE can be input in a period sufficiently shorter than the 200-cycle pulse. Accordingly, by inputting n drive pulses DRIVE, the output from the drive counter 14 is maintained high until n 200-cycle pulses are input.

The output from the drive counter 14 is output as a signal BUSY through an OR gate 30 and is also input into a control terminal of an output gate 20. The signal BUSY is provided to an external microcomputer, for example. The microcomputer recognizes from the signal BUSY that the drive circuit is in operation.

The fundamental waveforms 1 and 2 generated by the fundamental waveform generation circuit 10 are input into a direction selector 22. A direction control signal M/I provided from an external source is input to a control terminal of the direction selector 22 through an OR gate 34, an AND gate 24, and an OR gate 32. An in-operation signal from an initial counter 18 is inverted to low in operation and provided to the AND gate 24. Accordingly, when the initial counter 18 is not in operation, the direction control signal M/I is provided to the control terminal of the direction selector 22 without being changed.

Initial Movement

On the other hand, the direction control signal M/I output from the initial counter 18 is provided to the OR gate 32 through an EXOR (exclusive OR) gate 62. The direction control signal M/I output from the OR gate 34 is also provided to the EXOR gate 62. Accordingly, when the initial counter 18 is in operation, a direction control signal that is determined by exclusive OR of the direction control signal M/I output from the OR gate 34 and the direction control signal M/I from the initial counter 18 is provided to the direction selector 22.

Suppose that the direction control signal M/I input from an external source is forced low to instruct movement of a lens in the direction of infinity. The direction control signal M/I from the initial counter 18 is a signal that goes high only when the count value of the initial counter 18 is 175 or 176. The output from the EXOR gate 62 remains low until the count value reaches 175 and goes high only when the count value is 175 or 176.

Suppose, on the other hand, that the direction control signal M/I input from the external source is forced to high to instruct movement of the lens to the macro direction. Since the direction control signal M/I from the initial counter 18 remains low until the count value of the initial counter 18 reaches 175, the output from the EXOR gate 62 remains high until then and goes low only when the count value is 175 or 176.

In the present embodiment, by setting the output from the OR gate 34 to low level in this way, the lens is moved in the direction of infinity during initial operation. By setting the output from the OR gate 34 to high level, the lens is moved to the direction of macro during initial operation.

The direction selector 22 interchanges the fundamental waveforms 1 and 2 and outputs them through two output terminals, in accordance with the direction control signal M/I provided to its control terminal. In this example, the direction control signal M/I is a signal provided from the external microcomputer in order to instruct movement of the lens in the direction of macro (M) or the direction of infinity (I). The direction selector 22 outputs fundamental waves 1 and 2 through the two output terminals without interchanging when the direction control signal M/I is low. This signal causes the lens to move in the direction of infinity (I). On the other hand, when the direction control signal M/I is high, the direction selector 22 interchanges the fundamental waves 1 and 2 and outputs them through the two output terminals. This signal causes the lens to move in the direction of macro (M). The two outputs from the direction selector 22 are output as signals GATE_A and GATE_B through the output gate 20 to control elongation and contraction of the piezo element, thereby moving the lens in the infinity direction or the macro direction.

Figure 3:
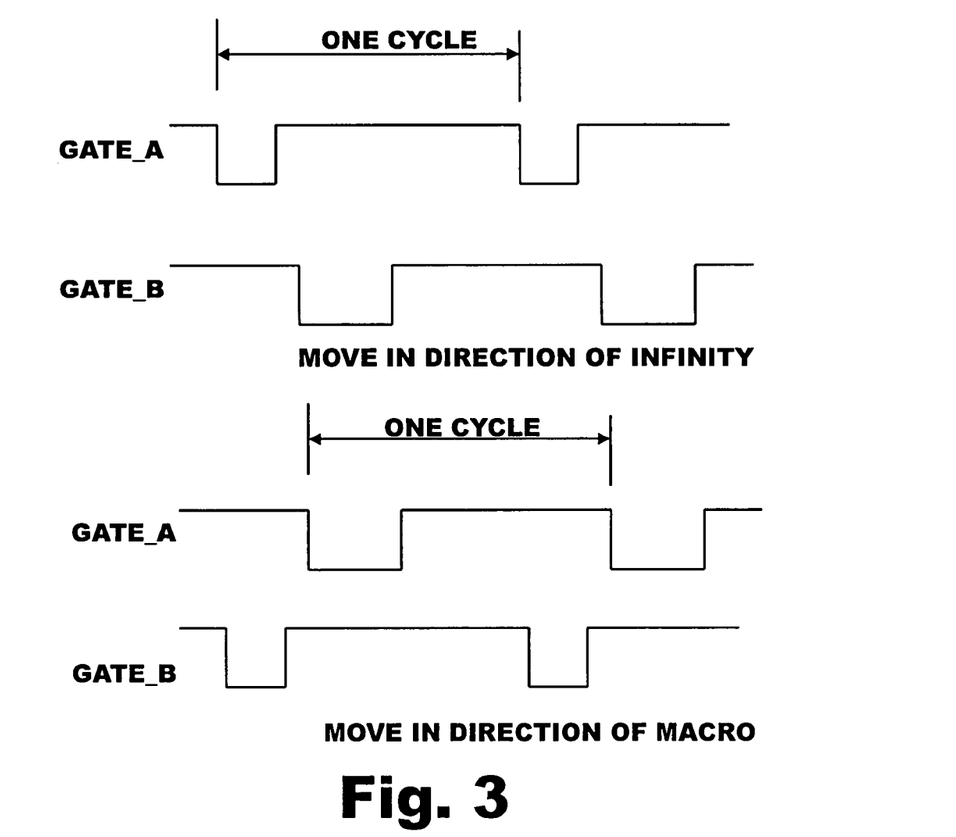
FIG. 3 is a diagram showing waveforms of drive waves.

As shown in FIG. 3, when the direction control signal M/I is low (indicating movement in the infinity direction), the fundamental waveforms 1 and 2 are output as GATE_A and GATE_B, respectively, without being interchanged; when the direction control signal M/I is high (indicating movement in the macro direction), the fundamental waveform 1 is output as GATE_B and the fundamental waveform 2 is output as GATE_A.

The direction control signal M/I is also provided to a change detection circuit 26. The change detection circuit 26 detects the rising edge and falling edge of the direction control signal M/I and outputs a change detection pulse. The change detection pulse is provided to a reset terminal of the 200-cycle counter 12 through an OR gate 28. An enable signal ENB is also provided to the OR gate 28. When the enable signal ENB is low, the OR gate 28 outputs a high-level signal.

The output from the OR gate 28 is provided to the reset terminals of the 200-cycle counter 12 and the drive counter 14. Accordingly, when the enable signal ENB is low and when the status of the direction control signal M/I changes (during a high-level period of a change detection pulse), the 20-cycle counter 12 and the drive counter 14 are reset.

The enable signal ENB is inverted and input to a reset terminal of the fundamental waveform generation circuit 10. When the enable signal ENB is low, the output from the fundamental waveform generation circuit 10 is disabled.

The enable signal ENB is also input into the initial counter 18. The initial counter 18 starts counting 200-cycle pulses only at the rising edge of the enable signal ENB and continues counting up to 176. For example, a completion signal is generated after the initial counter 18 counts up to 176. The completion pulse resets the initial counter 18 and halts the initial counter 18 until the next rising edge of the enable signal ENB. Thus, the initial counter 18 starts counting up to 176 only once after every rising edge of the enable signal ENB.

The initial counter 18 outputs a high-level signal through a terminal 171-174 when its count value is in the range from 171 to 174. The output is provided to the output gate 20 as a wait (output disable) signal. The initial counter 18 outputs through a terminal 175-176 the direction control signal M/I which is at high level when its count value is in the range from 175-176 and at low level when its count value is not in this range. That is, the initial counter 18 outputs the direction control signal M/I which causes the infinity direction to be selected when the count value is in the range from 0 to 174 and causes the macro direction to be selected when the count value is in the range from 175 to 176. The direction control signal M/I is provided to the direction selector 22 through the OR gate 32.

When the initial counter 18 is in operation, the AND gate 24 prohibits the output from the drive counter 14 and the output of the direction control signal M/I, and the output from the initial counter 18 causes the direction selector 22 and the output gate 20 to operate.

Accordingly, during initialization in which the enable signal ENB rises, the initial counter 18 starts operating to control the direction selector 22 and the output gate 20 to provide the direction control signal M/I that causes the lens to move in the direction of infinity, for example, during a period in which the count value is in the range from 0 to 174 and causes the lens to move in the direction of the macro during a period in which the count value is 175 or 176. After that, the direction control signal M/I is provided to the direction selector 22 without being manipulated.

The inverted in-operation signal from the initial counter 18, the output from the drive counter 14, and the in-operation signal from the initial counter 18 are also provided to the OR gate 30. The output from the OR gate 30 is provided to the output gate 20 as described above and is also output as a busy signal BUSY to the outside. Thus, when the initial counter 18 is in operation and when the count value of the drive counter 14 is not "0", the busy signal BUSY becomes high.

Serial Bus

The drive wave generation circuit according to the present embodiment further includes a serial interface (I/F) 50 based on I2C. An SDA bus and an SCL bus from the external microcomputer are connected to the serial I/F 50. Registers 52, 54, and 56 are connected to the serial I/F 50 through a data bus. Accordingly, the serial I/F 50 sequentially takes in data provided onto the SDA bus, in accordance with a transfer clock provided onto the SCL bus, and writes sent data into any of the registers 52, 54, and 56 that has an address specified in the data.

Data on a direction control signal DIR is written into the register 52 connected to the serial I/F 50, data on an output status signal ACTIVE is written into the register 54, and data concerning a fundamental waveform is written into the register 56.

The direction control signal DIR from the register 52 is input in the OR gate 34. Accordingly, switching between the output of a drive wave for moving the lens in the direction of the infinity position and the output of a drive wave for moving the lens in the direction of the macro position can be made by the direction control signal DIR written in the register 52 while maintaining the direction control signal M/I provided from the microcomputer low.

The output status signal ACTIVE from the register 54 is provided to the OR gate 34. Accordingly, when the output status signal ACTIVE is high, the output gate 20 is enabled and the fundamental waves 1 and 2 provided from the direction selector 22 are output to GATE_A or GATE_B.

The register 54 is also connected to the fundamental waveform generation circuit 10. The fundamental waveform generation circuit 10 controls the waveforms, waveform 1 and waveform 2, it generates in accordance with data written in the register 54. The duty ratio, timing, and frequency, for example, may be determined on the basis of the data written in the register 54. For example, data concerning the waveforms 1 and 2 may be written into the register 54 and may be read by the fundamental waveform generation circuit 10 to generate the fundamental waveforms 1 and 2.

The direction control signal M/I and the drive pulse DRIVE may be provided to generate a drive wave instead of using the serial bus, and the serial bus may be used to send data indicating which of the signals is to be used. The data may be stored in a register and used for switching between the modes.

It is also preferable that the count value of the 200-cycle counter 12 and the set value in the initial counter 18 may be data transferred through the serial bus. For example, the set value to which the 200-cycle counter 12 counts up may be other than 200. The value may be 150 or 300 for example. Thus, the number of fundamental waveforms to be generated by one drive pulse can be set to a value other than 200.

Furthermore, the set value in the initial counter 18 may be changed to set any number of drive waves for moving the lens in one direction (the direction of infinity) in the initial state or any number of drive waves for returning the lens. For example, any setting can be made such as: 1 to 149 for movement in the direction of infinity, 150 to 154 for wait, and 155 or 156 for movement in the direction of macro.

Use of Fixed Memory

In the present embodiment, a selector 58 is provided between the serial I/F 50 and the register 56. A fixed memory 60 is connected to the selector 58. Accordingly, the selector 58 can be used to select data from the serial I/F 50 or data from the fixed memory 60 to store in the register 56.

Figure 6:
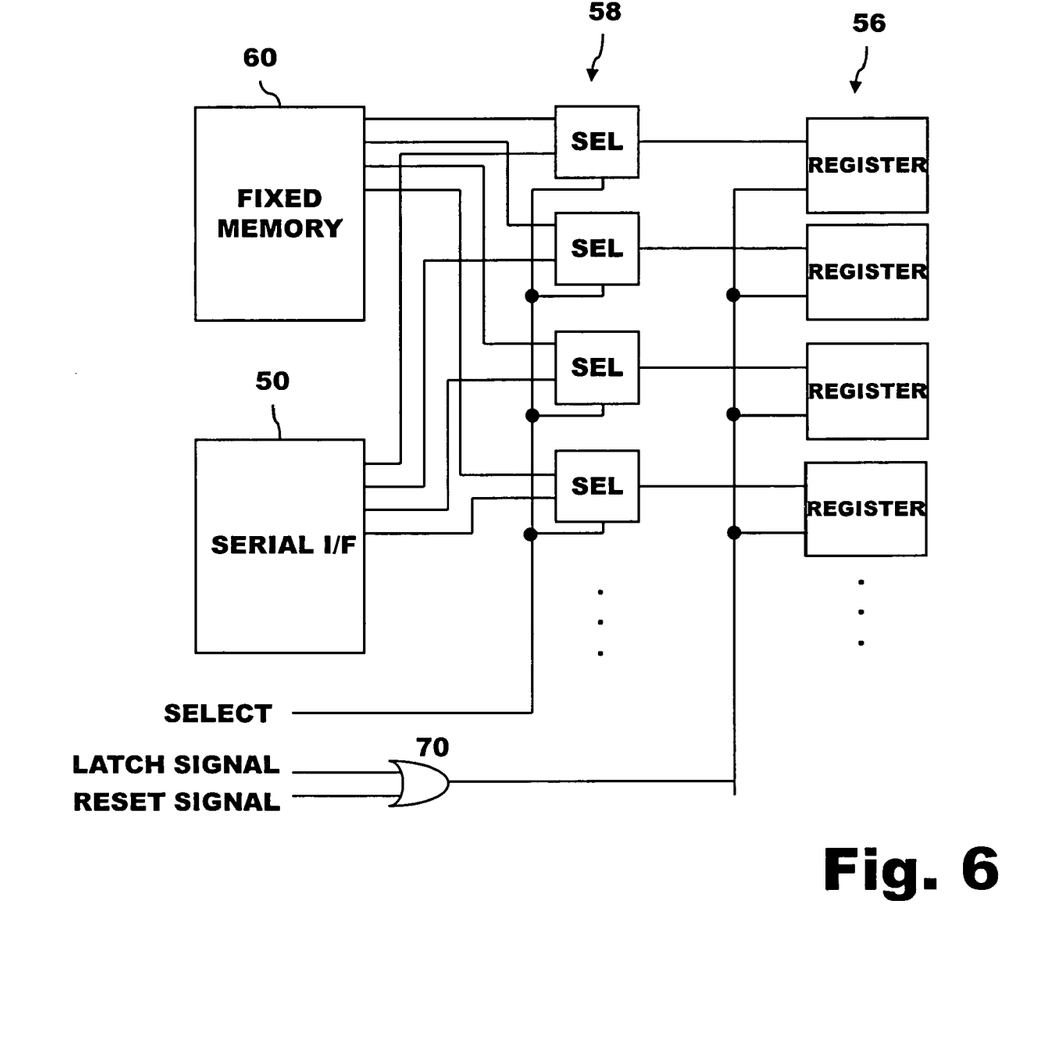
FIG. 6 is a diagram showing a configuration consisting of selectors and registers.

FIG. 6 shows a specific configuration. Each bit of fixed value data from the fixed memory 60 and each bit of setting data from the serial I/F 50 are input into each bitwise selector 58. The output from each bitwise selector 58 is connected to each bit of the register 56. Which of the selectors 58 is to be selected is determined by a select signal SELECT. The select signal SELECT is preferably serially transferred from the microcomputer and is set in a register separately provided. For example, the select signal SELECT may be set so that the fixed memory 60 is selected by default.

A latch signal and a reset signal are input to an OR gate 70. The output from the OR gate 70 is provided to a control terminal of each bit register 56. The register 56 directly outputs the input signal when the input into the control terminal is at high level. When the input into the control terminal goes low, the current value at that time is held in the register 56.

At start-up of the system, the reset signal temporarily goes high and the selector 58 selects the fixed memory 60. When the reset signal goes back to low level, data in the fixed memory 60 is held in the register 56. On the other hand, when data is to be set by serial transfer, the select signal SELECT is driven high to select the serial I/F 50, and then the latch signal goes high. As a result, serial data sent from the external source is provided to the register 56 as parallel data. When the latch signal goes back to low level, the data is set in the register 56.

Operation of the drive wave generation circuit described above will be described below.

Initialization Operation

When the camera is powered on in order to use the camera, the microcomputer for controlling operation of the camera is activated to set the enable signal ENB to low level initially. When the enable signal ENB is low, a reset signal is provided to the fundamental waveform generation circuit 10, the 200-cycle counter 12, the drive counter 14, and the initial counter 18. The internal counter is reset and the drive wave generation circuit is placed in halt state. The reference clock CLK is provided from the external microcomputer. While the direction control signal M/I and the drive pulse DRIVE are not necessary at this stage, the drive counter 14 is preferably reset. The reset signal may be the inversion of the enable signal.

The microcomputer then changes the enable signal ENB from low to high. This rising activates the fundamental waveform generation circuit 10, the 200-cycle counter 12, the drive counter 14, and the initial counter 18. Since the in-operation signal from the initial counter 18 is driven high, the BUSY signal goes high and a control signal for enabling output is provided to the output gate 20.

Since the inverted in-operation signal from the initial counter 18 is provided to the AND gate 24, the output of the AND gate 24 goes low and the low signal is provided to the direction selector 22 through the OR gate 32. Therefore the direction selector 22 outputs a pair of fundamental waveforms 1 and 2 for moving the lens in the direction of infinity.

The initial counter 18 counts up 200-cycle pulses from the 200-cycle pulse counter 12. When the count value of the initial counter 18 reaches 171, a wait signal is provided to the output gate 20 and output from the output gate 20 is disabled. When the count value of the initial counter 18 is 175 or 176, the high-level direction control signal M/I is output from the initial counter 18 and therefore the fundamental waveforms 1 and 2 for moving the lens in the direction of macro are interchanged in the direction selector 22 and are output from the output gate 20.

When the count value reaches 177, an overflow signal is output, the initial counter 18 stops counting, and the in-operation signal becomes low. With this, the initialization operation will end.

A flip-flop that is set by the rising of the enable signal ENB, for example, may be provided, and the output from the flip-flop may be used to enable operation of the initial counter 18. The flip-flop may be reset by the overflow signal to reset the initial counter 18.

According to the present embodiment, the enable signal ENB signaling whether to activate the drive waveform generation circuit is used to perform the initialization operation. Therefore, an extra control signal for causing initialization does not need to be supplied and the number of terminals in the drive wave generation circuit can be reduced.

Furthermore, since the reset signal goes temporarily high to cause data in the fixed memory 60 to be set in the register 56 as described above, the fundamental waveforms 1 and 2 based on the data set in the fixed memory 60 are output from the fundamental waveform generation circuit 10. Since the fixed memory 60 is used, the value in the register 56 can be settled quickly and a drive wave can be generated quickly even through the register 56 is rewritable. The fixed memory 60 may be a rewritable non-volatile memory such as a memory made of lines, a mask ROM, or a flash memory.

In the present embodiment, the amount of movement in the direction of infinity equivalent to 170 200-cycle pulses is such that the lens resting at any position is moved to a limiting point in the direction of infinity and mechanically stopped. As a result of this movement, the lens is held at a position beyond the infinity position. After a certain wait time, the lens is moved in the direction of macro by an amount equivalent to two 200-cycle pulses to ensure that the lens is accurately held at the infinity position. The initial position of the lens may be the macro position, which is in the opposite direction. The lens can be initially positioned at any position by changing the amount of movement after the wait period. Thus, the initial position of the lens can be determined without using a sensor or the like for detecting the position of the lens.

Change of Initial Position

In the present embodiment, the EXOR gate 62 is provided so that the output of the initial counter 18 can be inverted, as described above. Data transferred serially is written in the register 52 which determines the direction of movement. Determining the direction of initial movement by the serial transfer is not so preferable. Preferably, the initial operation is controlled in accordance with the count value of the initial counter 18 based on the direction control signal M/I output from the microcomputer. However, the initial operation does not necessarily need to be determined by the direction control signal M/I.

When the output from the OR gate 34 is high, the output ports of the fundamental waveforms 1 and 2 are inverted in the direction selector 22 and therefore a drive wave that moves the lens in the direction of the macro position is output. That is, the high-level direction control signal M/I or a signal that drives the direction control signal DIR high is output from the microcomputer to invert the operation of the direction selector 22 that operates in accordance with the output from the initial counter 18. Thus, the lens can be initially moved in the direction of the macro position.

Normal Operation

In normal operation, the reference clock CLK is provided regularly and the enable signal ENB is at high level. In this state, the microcomputer determines the direction and amount of movement of the lens based on focusing information and provides the direction control signal M/I and the drive pulse DRIVE according to the direction and the amount of movement to the drive wave generation circuit. When the lens is to be moved in the direction of macro, the direction control signal M/I is set at high level, while when the lens is to be moved in the direction of infinity, the direction control signal M/I is set at low level. A number of drive pulses DRIVE that depends on the amount of movement of the lens are provided to the drive counter 14. In the present embodiment, a piezo element is used to move the lens by approximately 5 μm by applying 200 pulses of fundamental waveforms 1 and 2. When it is determined that the lens should be moved by 50 μm, 10 drive pulses are sent and the count value of the drive counter 14 is set to 10. When the value of the drive counter 14 is made 0 by the output from the 200-cycle counter 12, the output from the drive counter 14 is provided to the control terminal of the output gate 20, thereby disabling the output of drive wave from the output gate 20.

In this way, according to the present embodiment, one drive pulse is made equivalent to 200 cycles of the fundamental waveforms 1 and 2. Thus, the frequency of the drive pulse generated by the microcomputer is sufficiently lower than the fundamental waveforms and therefore the processing load on the microcomputer is small. Furthermore, since the fundamental waveforms themselves do not need to be generated by the microcomputer, the processing load on the microcomputer is further reduced.

Focusing information may be obtained from information about the brightness of a captured image. That is, when proper focus is achieved, a high brightness of the image is obtained. The lens is moved in one direction and a change in the brightness is detected. The information about focusing can be obtained from the change. It is often preferable that the lens is moved beyond a focused point, and then moved back in the opposite direction to an optimum point.

According to the present invention, when a change in the direction control signal M/I is detected by the change detection circuit 26, the 200-cycle counter 12 and the drive counter 14 are reset to 0. Accordingly, the microcomputer outputs 100 drive pulses, for example, to move the lens in one direction, and detects a position where proper focus is achieved. When the lens is moved beyond the focused focal point, the distance to the focused focal position is calculated. A number of drive pulses that is equivalent to the distance can be output to achieve a proper focus. If the lens has been moved initially in the opposite direction, the direction can be quickly reversed by changing the direction control signal M/I.

In this way, by resetting the drive counter 14 in response to a change of the direction control signal M/I, the flexibility of the process sequence in focusing operation by the microcomputer can be increased and appropriate focusing operation can be accomplished.

The drive counter 14 alone may be reset without resetting the 200-cycle counter 12.

Thus, according to the present embodiment, a drive wave can be effectively generated by the combination of the direction control signal M/I and the drive pulse DRIVE.

Figure 4:
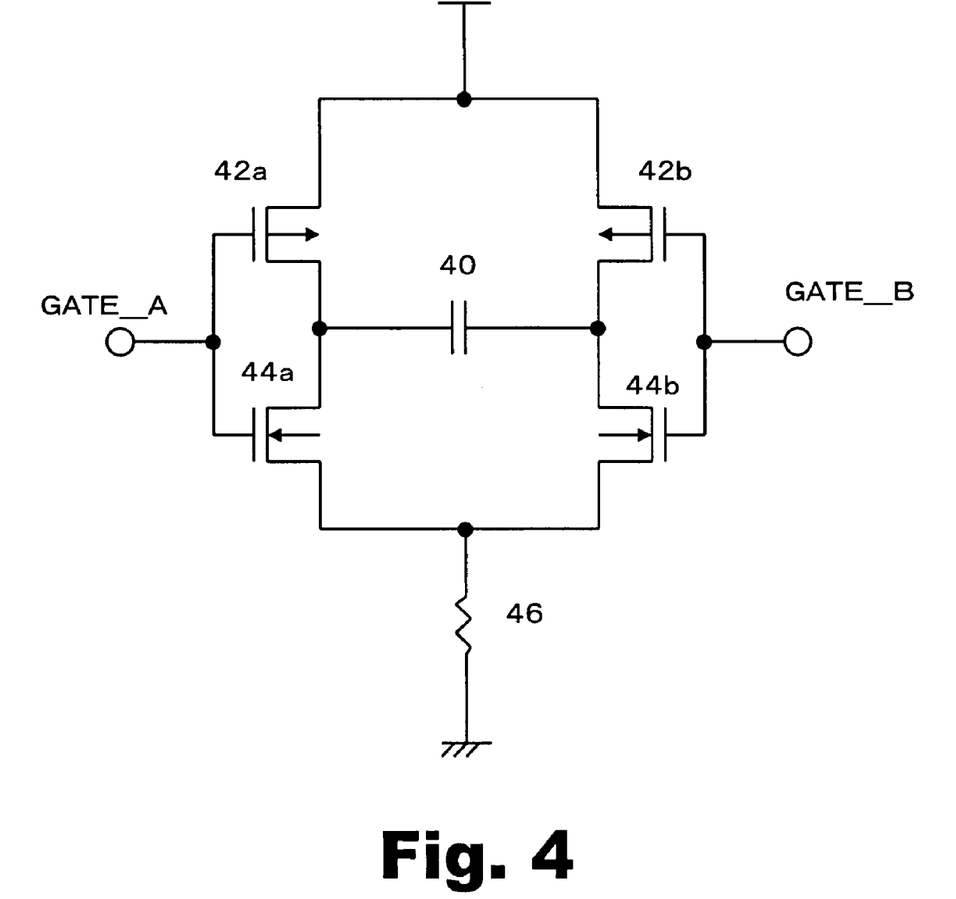
FIG. 4 is a diagram showing a drive circuit for a piezo element.

FIG. 4 shows an example of a piezo element drive circuit. Because a piezo element 40 can be considered as a capacitor in electrical terms, the piezo element 40 is shown as a capacitor.

The sources of two p-channel transistors 42a and 42b are connected to a power supply. Connected to the drains of the transistors 42a and 42b are the drains of n-channel transistors 44a and 44b, respectively. The sources of the transistors 44a and 44b are connected to a ground through a resistor 46. Signal GATE_A is input into the gates of the transistors 42a and 44a and signal GATE_B is input into the gates of the transistors 42b and 44a. The piezo element 40 is connected between the connection point between the transistors 42a and 44a and the connection point between the transistors 42b and 44b.

The transistors 42a and 44a form an inverter and inverted GATE_A is provided to one end of the piezo element 40. The transistors 42b and 44b form an inverter and inverted GATE_B is provided to the other end of the piezo element 40.

Figure 5:
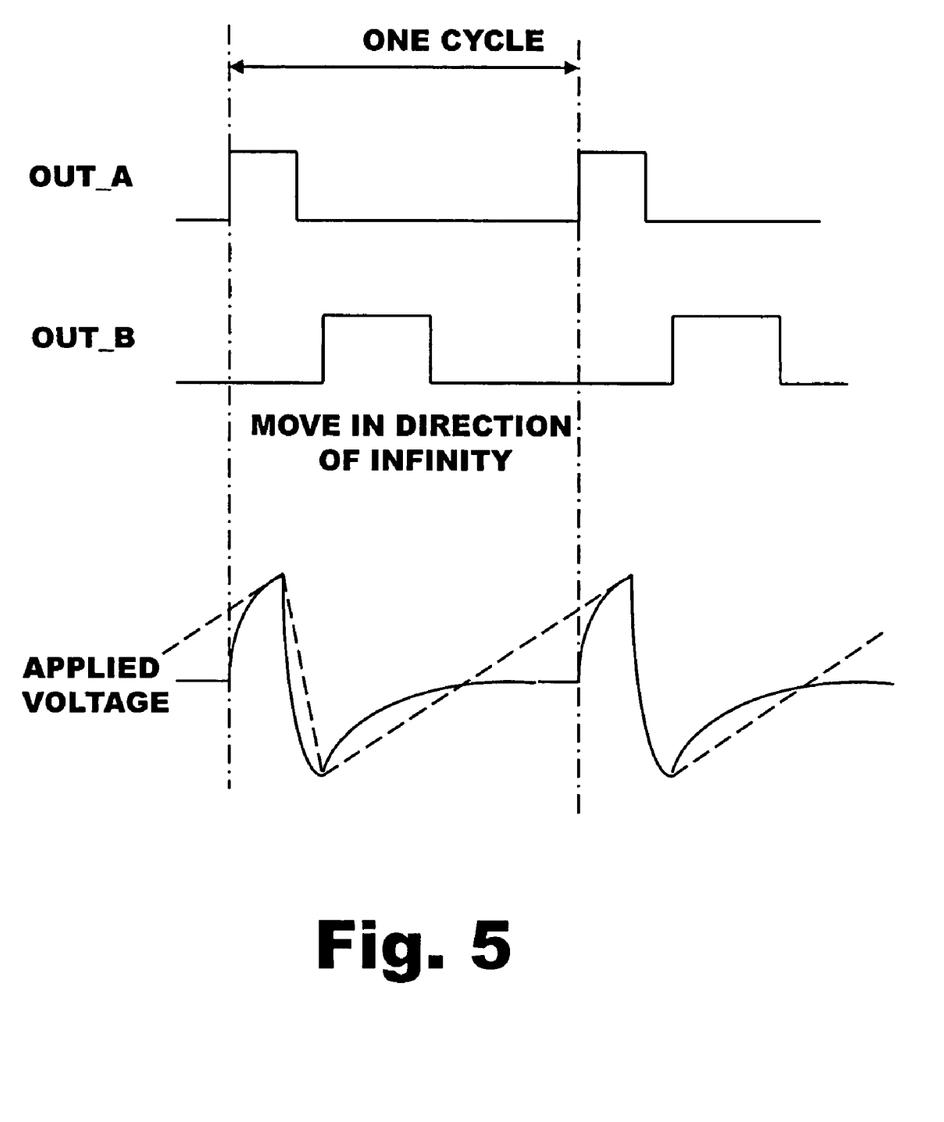
FIG. 5 is a diagram showing a drive waveform for the piezo element.

Accordingly, when the fundamental waveforms 1 and 2 in FIG. 2 are provided to the drive circuit as GATE_A and GATE_B, respectively, the voltage OUT_A at end 40A of the piezo element 40 and the voltage OUT_B at the other end 40B are going to change as shown in FIG. 5. When the transistors 42a and 42b are turned on, a power-supply voltage is immediately applied to the piezo element 40. When the transistors 44a and 44b are turned on, the voltage at the end 40A of the piezo element 40 changes with respect to the voltage of the other end 40B as shown in FIG. 5 because of the provision of the resistance 46. Thus, a sawtooth voltage which is abruptly applied in one direction and gradually changes in the other direction can be applied to the piezo element 40 as indicated by the dashed line in FIG. 5. As a result, the piezo element 40 slowly elongates and quickly contracts (or vice versa). The difference in speed between elongation and contraction enables the lens to be moved.

Operation Based on Serial Data

When high-level signal is written into the register 54 as serial data and the direction control signal DIR is written into the register 52 in normal operation, a drive wave starts to be output in the direction determined by the direction control signal DIR. The drive wave is continuously output during a period in which high level is written into the register 54 and an output status signal ACTIVE is maintained high. Therefore, data can be written into the registers 52 and 54 through the serial bus to continue to output a drive wave during a desired period and in a desired direction.

What is claimed is:

1. A drive wave generation circuit which generates a drive wave for driving a piezo actuator, comprising:
   a register configured to store fundamental waveform data, wherein the fundamental waveform data includes data for setting a duty ratio;
   a memory configured to store preset fundamental waveform data, wherein the preset fundamental waveform data includes data for setting a duty ratio;
   a serial interface configured to provide transferred fundamental waveform data to the register, wherein the transferred fundamental waveform data includes data for setting a duty ratio;
   a selector configured to select whether the register stores preset fundamental waveform data provided by the memory or transferred fundamental waveform data provided by the serial interface as the fundamental waveform data in the register; and
   a fundamental waveform generation circuit configured to generate a fundamental waveform;
   wherein the fundamental waveform has a duty cycle in accordance with the fundamental waveform data stored in the register, and
   wherein the drive wave is generated on the basis of the fundamental waveform data stored in the register.

2. The drive wave generation circuit according to claim 1, further comprising:
   a unit counter which counts cycles of a fundamental waveform and, when the count value reaches a predetermined unit count, outputs a unit detection pulse;
   a drive counter which counts input drive pulses from an initial value in one direction and counts count values in the direction of the initial value in accordance with a unit detection pulse from the unit counter; and
   an output gate which outputs a drive wave including a fundamental waveform after the drive counter counts in one direction up to the initial value;
   wherein a drive wave including fundamental waveforms is output, the number of the fundamental waveforms being the number of input drive pulses multiplied by the number of fundamental cycles in one unit.

3. The drive wave generation circuit according to claim 2, wherein:
   the fundamental waveform generation circuit generates two types of fundamental waveforms;
   the drive wave generation circuit comprises a direction selector which receives the two types of fundamental waveforms from the fundamental waveform generation circuit and perform selection, in accordance with a direction control signal, as to which of two output terminals is used to output each of the received two types of waveforms;
   wherein, the output gate receives an output from the direction selector and permits output from the direction selector in a period from the time the drive counter starts counting in one direction to the time the initial value is reached to output a drive wave including a pair of fundamental waveforms.

* * * * *